United States Patent
Harar et al.

(10) Patent No.: US 11,436,149 B2
(45) Date of Patent: Sep. 6, 2022

(54) CACHING OPTIMIZATION WITH ACCESSOR CLUSTERING

(71) Applicant: Microsoft Technology Licensing, LLC, Redmond, WA (US)

(72) Inventors: Amir Harar, Tel Aviv (IL); Tomer Haimovich, Tel Aviv (IL); Itay Argoety, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/746,894

(22) Filed: Jan. 19, 2020

(65) Prior Publication Data

US 2021/0224194 A1 Jul. 22, 2021

(51) Int. Cl.
*G06F 12/0877* (2016.01)
*G06F 9/50* (2006.01)
*G06F 11/34* (2006.01)
*H04L 67/1001* (2022.01)
*G06F 9/455* (2018.01)

(52) U.S. Cl.
CPC .......... *G06F 12/0877* (2013.01); *G06F 9/505* (2013.01); *G06F 9/5033* (2013.01); *G06F 9/5061* (2013.01); *G06F 9/5083* (2013.01); *G06F 11/3433* (2013.01); *H04L 67/1001* (2022.05); *G06F 2009/4557* (2013.01); *G06F 2212/1041* (2013.01)

(58) Field of Classification Search
None
See application file for complete search history.

(56) References Cited

U.S. PATENT DOCUMENTS

| | | | |
|---|---|---|---|
| 9,727,723 | B1 | 8/2017 | Kondaveeti et al. |
| 10,498,755 | B2 | 12/2019 | Harris et al. |
| 2012/0284793 | A1 | 11/2012 | Steinbrecher et al. |
| 2013/0305357 | A1 | 11/2013 | Ayyagari et al. |

(Continued)

FOREIGN PATENT DOCUMENTS

WO 2015184425 A1 12/2015

OTHER PUBLICATIONS

"Big data", retrieved from <en.wikipedia.org/wiki/Big_data>, Jan. 5, 2020, 16 pages.

(Continued)

*Primary Examiner* — Eric C Wai
(74) *Attorney, Agent, or Firm* — Ogilvie Law Firm

(57) ABSTRACT

Distributed computing system (DCS) performance is enhanced by caching optimizations. The DCS includes nodes with local caches. Resource accessors such as users are clustered based on their similarity, and the clusters are assigned to nodes. Then processing workloads are distributed among the nodes based on the accessors the workloads implicate, and based on which nodes were assigned to those accessors' clusters. Clustering may place security peers together in a cluster, and hence place peers together on a node. Security peers tend to access the same resources, so those resources will more often be locally cached, improving performance. Workloads implicating peers also tend to access the same resources, such as peers' behavior histories, so those resources will likewise tend to be cached locally, thus optimizing performance as compared for example to randomly assigning accessors to nodes without clustering and without regard to security peer groupings.

20 Claims, 4 Drawing Sheets

(56) References Cited

U.S. PATENT DOCUMENTS

| | | | |
|---|---|---|---|
| 2014/0150066 A1 | 5/2014 | Chandolu et al. |
| 2016/0248800 A1 | 8/2016 | Ng et al. |
| 2017/0103194 A1 | 4/2017 | Wechsler |
| 2017/0103203 A1 | 4/2017 | Sharma et al. |
| 2017/0118240 A1 | 4/2017 | Devi Reddy et al. |
| 2017/0148085 A1 | 5/2017 | Tang et al. |
| 2018/0234443 A1 | 8/2018 | Wolkov et al. |
| 2018/0248895 A1 | 8/2018 | Watson et al. |
| 2018/0349599 A1 | 12/2018 | Teller et al. |
| 2018/0375886 A1 | 12/2018 | Kirti et al. |
| 2019/0349391 A1 | 11/2019 | Elsner et al. |
| 2020/0019365 A1 | 1/2020 | Spooner |
| 2020/0143240 A1 | 5/2020 | Baker |
| 2020/0169565 A1 | 5/2020 | Badawy et al. |
| 2020/0257797 A1 | 8/2020 | Monsonego et al. |
| 2020/0274894 A1 | 8/2020 | Argoeti et al. |

OTHER PUBLICATIONS

"Cache (computing)", retrieved from <en.wikipedia.org/wiki/Cache_(computing)>>, Dec. 25, 2019, 8 pages.

"Locality of reference", retrieved from <//en.wikipedia.org/wiki/Locality_of_reference>>, Dec. 7, 2019, 6 pages.

"Collaborative Filtering", Retrieved From: en.wikipedia.org/wiki/Collaborative_filtering, Retrieved Date: Sep. 22, 2020, 12 Pages.

"Collaborative Filtering", Retrieved From: spark.apache.org/docs/2.2.0/ml-collaborative-filtering.html, Retrieved Date: Sep. 22, 2020, 3 Pages.

"Evaluation Measures (Information Retrieval)", Retrieved From: en.wikipedia.org/wiki/Evaluation_measures_(information_retrieval)#Mean_average_precision, Retrieved Date: Sep. 22, 2020, 10 Pages.

"What is Azure Advanced Threat Protection?", Retrieved From: docs.microsoft.com/en-us/azure-advanced-threat-protection/what-is, Apr. 5, 2020, 5 Pages.

Baldwin, et al., "Microsoft Cloud App Security Overview", Retrieved From: docs.microsoft.com/en-us/cloud-app-security/what-is-cloud-app-security, Aug. 15, 2019, 5 Pages.

"Notice of Allowance Issued in U.S. Appl. No. 16/271,835", dated Mar. 24, 2021, 9 Pages.

"International Search Report and Written Opinion Issued in PCT Application No. PCT/US2020/064749", dated Mar. 22, 2021, 12 Pages.

"International Search Report and Written Opinion Issued in PCT Application No. PCT/US20/014588", dated Nov. 10, 2020, 11 Pages.

Turcotte, et al., "Poisson Factorization for Peer-Based Anomaly Detection", In Proceedings of IEEE Conference on Intelligence and Security Informatics (ISI), Sep. 28, 2016, pp. 208-210.

"22 Best Alternatives to Microsoft Active Directory", Retrieved from: thegeekpage.com/22-best-alternatives-to-microsoft-active-directory/, Jan. 20, 2018, 16 Pages.

"CBA: RSA Cloud Behavioral Analytics", Retrieved from: community.rsa.com/docs/DOC-86678, Sep. 11, 2018, 03 Pages.

"Exabeam Advanced Analytics", Retrieved from: web.archive.org/web/20190314103535/https://www.exabeam.com/product/exabeam-advanced-analytics/. Retrieved Date: Feb. 9, 2019, 09 Pages.

"Intelligent Security Operations", Retrieved from: www.mcafee.com/enterprise/en-us/solutions/intelligent-security-Operations.html, Retrieved Date: Feb. 9, 2019, 07 Pages.

"Securonix User and Entity Behavior Analytics", Retrieved from: www.securonix.com/products/ueba/, Retrieved Date: Feb. 9, 2019, 06 Pages.

"Splunk User Behavior Analytics", Retrieved from: www.splunk.com/pdfs/fact-sheets/splunk-user-behavior-analytics.pdf, 2015, 02 Pages.

"Symantec Information Centric Analytics", Retrieved from: www.symantec.com/content/dam/symantec/docs/data-sheets/information-centric-analytics-en.pdf, 2018, 03 Pages.

"User Behavior Analytics", Retrieved from: web.archive.org/web/20180906000452/https://www.rapid7.com/fundamentals/user-behavior-analytics/, Sep. 6, 2018, 05 Pages.

"User Behavior Analytics", Retrieved from: en.wikipedia.org/wiki/User_behavior_analytics, Retrieved Date: May 8, 2020, 02 Pages.

"International Search Report and Written Opinion Issued in PCT Application No. PCT/US2020/014548", dated Apr. 7, 2020, 14 Pages.

"Non Final Office Action Issued in U.S. Appl. No. 16/287,592", dated Nov. 9, 2021, 23 Pages.

EXAMPLE CACHING PERFORMANCE OPTIMIZATION METHOD 700

CACHING OPTIMIZATION WITH ACCESSOR CLUSTERING

BACKGROUND

Noon In some computing systems, caching operations store data so that future requests for that data can be satisfied faster. The cached data is kept in cache entries. A cache hit occurs when the requested data is found in a cache, and a cache miss occurs when the data is not found in the cache. After a miss, the requested data is recomputed and put in the cache, or is fetched from other data storage and put in the cache. Often an existing cache entry value is removed (evicted from the cache) in order to make room for the newly retrieved or recomputed data.

Cache hits tend to improve computing system performance by rapidly providing the requested data to the requestor straight from the cache, which is often faster than recomputing the data or reading the data from slower data storage. To increase the likelihood of hits, cache entries may be forced to expire and may be evicted if they have not been used recently. For example, under a least recently used (LRU) replacement policy, when the cache is updated with new data after a miss, to make room for the new data the cache replaces the oldest entry, namely, the cache entry that was accessed less recently than any other entry. The new data takes the place of the older data, which is thereby evicted.

The effectiveness of caching may be improved in various ways, of which perhaps the easiest is simply to increase the size of the cache. Another approach is to increase the speed of the cache, e.g., by using faster memory. Other caching optimizations are also possible, but may be considerably more complex. In some cases, multiple optimizations may be combined.

SUMMARY

Some embodiments described in this document provide improved efficiency during computations in a distributed computing system, in particular by increasing cache hits in local caches of the distributed computing system. Some embodiments increase the likelihood of cache hits by clustering data of security peers together on nodes of the distributed computing system, on the assumption that such peers tend to access the same data over time. Retrieving data from a cache on a node X for use in computation performed on the node X may also be assumed to be faster than retrieving data from another node Y. Other distributed software performance efficiency improvements may also be provided.

Some embodiments use or include performance optimization for user behavior analysis or other analytic computations in a distributed computing system. The system includes a set of N analysis nodes, with N being at least 2. Each analysis node includes an analysis memory and an analysis processor. The analysis memory includes a cache. A clustering processor is in operable communication with a clustering memory. The clustering processor may be in addition to the analysis processors, or a given processor may operate both as an analysis processor and as the clustering processor. More than one clustering processor may also be present. The clustering processor is configured to perform steps for performance optimization which include (a) clustering resource accessors into at least N accessor clusters, (b) assigning each accessor cluster to an analysis node, and (c) distributing analysis workloads among the analysis nodes. Each analysis workload AWi is distributed to be performed on an analysis node ANj based at least on (c1) identifying an accessor Ak in AWi and (c2) finding the same accessor Ak in an accessor cluster ACm that is assigned to ANj.

Some embodiments optimize analysis node cache performance while avoiding distributing analysis workloads based on assigning cloud tenants to analysis nodes. Some embodiments optimize analysis node cache performance while avoiding distributing analysis workloads based on assigning users randomly to analysis nodes. Some do both avoidances.

One of skill will understand that particular designations such as "AWi", "ANj", "Ak", and "ACm" used here merely for convenience. A given embodiment or an accurate description thereof may use different identifiers or use other designations when documenting, implementing, or performing the same or equivalent performance optimization actions describe herein. There is no intent here to limit the scope of the claims to variables or other computer-implemented data structures having the specific designations used herein.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
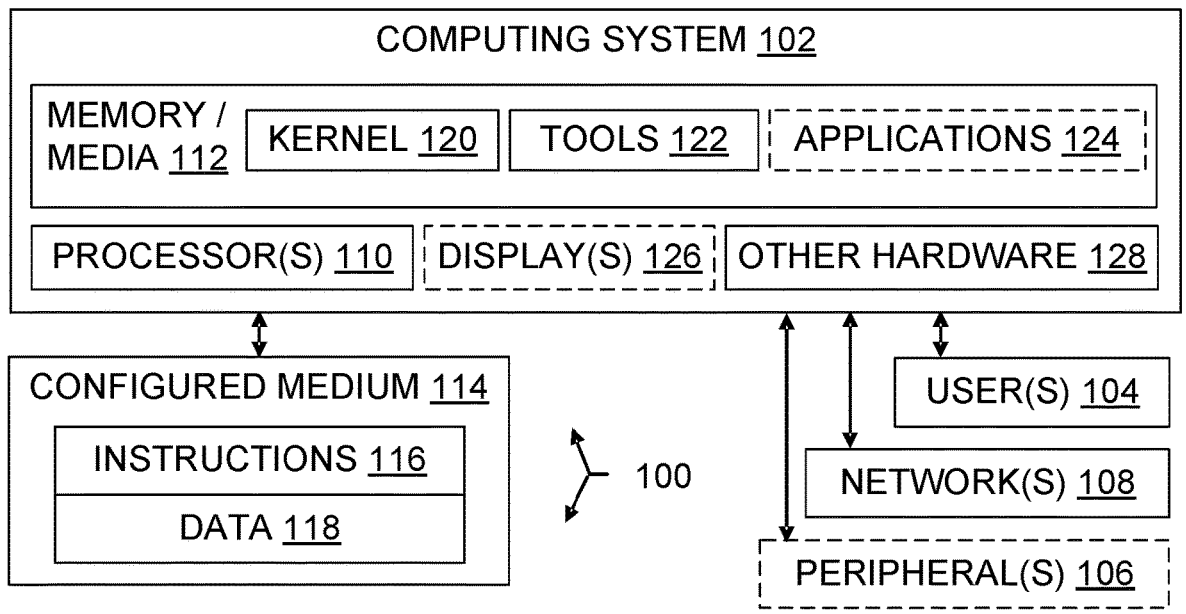
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the performance of user behavior analysis software, which can be used to improve cybersecurity by detecting anomalous behavior. Innovators recognized that the "big data" aspect of performing user behavior analysis meant that a distributed computing system would likely provide better performance than trying to analyze behavior data on a single server or other single computer instance.

With regard to the term "big data", one of skill will acknowledge that the amount, variety, or velocity of data sufficient to qualify as "big data" evolves as computing capabilities evolve, because one aspect of big data is that it is too large or complex to be effectively processed using traditional data-processing application software. More generally, "big data" is widely understood as data whose volume, variety, or velocity, or some combination thereof, indicates or even requires the use of parallel processing software running on tens, hundreds, or even thousands of servers. But for present purposes, a threshold question is simply whether processing will be done on a distributed computing system, not whether the processing involves data that qualifies as "big data". That is, the caching optimization tools and techniques described herein may be beneficially applied to enhance parallel processing in distributed computing systems regardless of which definition (if any) of "big data" happens to be met.

One technical challenge of user behavior analysis was to how to make distributed processing more efficient while maintaining scalability. This led to the technical challenge of making caching more efficient without losing scalability, and in particular to the technical challenge of determining how to distribute data among processing nodes in ways that tend to increase cache hits. That is, given a set of processing nodes, each with its own cache, how should data that is cached be automatically distributed among the various node caches?

In a cloud-based distributed processing system, such as one with a cloud service provider processing data about user behavior in the cloud, one data distribution approach would be to randomly assign users to processing nodes. Then on each node X cache the data that is accessed while analyzing the behavior of the users who were assigned to node X.

But such a random assignment approach does not provide adequate cache hit optimization because resource accesses are not randomly distributed among users. Peers will often reside in a different partition (i.e., node), and there is no guarantee that the relevant resources will reside on the same partition as well. Suppose a user U1 in a set of users {U1, U2, . . . Un} has accessed a digital resource R1. Then in practice the likelihood that R1 will also be accessed by another user is not equally distributed across all the other users U2 . . . Un. Instead, the likelihood that another user U1 will access R1 is greater if the other user Ui works with U1 on a project involving R1, for example, or if U1 created R1 specifically for use or review by the other user Ui. For instance, R1 might be a report prepared by U1 for Ui, or R1 might be a software component written by U1 for inclusion in a program that Ui is also helping develop, and so on.

However, it is not feasible in general to track every resource-user and user-user relationship, especially over time, and especially without imposing undesired administrative overhead. Thus, it is not feasible generally to optimize cache hits based on current and detailed information about which users work together on which projects using which digital resources.

Another approach to data distribution groups users for caching by assigning users to analysis nodes based on whether the users belong to the same cloud tenant. This may provide some optimization, when users who belong to the same organization tend to work with one another and tend to use the same resources, when the organization is registered with the cloud service provider as a tenant. But this approach may overload a node when the tenant includes a large number of users. This approach also ignores the possibility that users in one organization (tenant T1) may work intensively with users in another organization (tenant T2). For example, in some environments different departments or teams within an organization are registered as different tenants in one or more clouds, but still work frequently with one another using the same resources, e.g., a quality control or testing team may use the same code base as a development team. When T1 and T2 are assigned to different nodes, resources used in the T1-T2 interactions will often be transmitted from the T1 node to the T2 node or vice versa, instead of being read from a local cache.

Accordingly, some embodiments taught herein use one or more other grounds to organize distribution of users and resources among nodes of a distributed computing system, in order to optimize node cache hits. Some embodiments divide users into N distinct clusters based on their resource access patterns, user similarity, or another fitting metric. N may be chosen based on the number of partitions considered suitable to distribute the load. The resulting peer partitions are then used to partition the behavioral events or other data arriving at the distributed computing system.

Some innovations described herein arose in the context of efforts to increase cybersecurity. In general, cybersecurity tries to reduce or prevent attacks that damage desirable qualities of data and computing resources, such as confidentiality, availability, and integrity. In particular, installing tools and techniques for detecting unusual behavior is one of the many possibilities to consider when implementing "defense in depth" in a cybersecurity infrastructure. Tools and techniques have been developed for user behavior analytics (UBA) and for user and entity behavior analytics (UEBA), which may detect financial fraud, insider threats, targeted attacks from external sources, and other malicious behaviors in the context of routine and authorized behaviors. UBA and UEBA look at patterns of behavior by humans or by automated entities or both, and then apply algorithms (which may in turn apply statistical analysis) to detect significant departures from established patterns of behavior. Those departures, which may also be referred to as "anomalies", are then investigated as potential threats.

Distributed computing systems may be used to handle the large computing workloads involved in some behavior analytics. Thus, the caching optimizations taught herein may be particularly beneficial for improving the performance of behavior analytics, even though these caching optimizations are not strictly limited to use in behavior analytics systems or even to use in a security infrastructure.

For example, behavior analytics like UBA and UEBA often presume that users who are alike will behave similarly unless something happens that increases cyber risk. This presumption poses the technical challenge of how to utilize available information to determine which two users should be considered similar to one another for the purpose of behavior analytics. A variety of effective and scalable algorithms using collaborative filtering, machine learning, and other functionalities may be used to compute peer "likeness" (a.k.a. peer "similarity") scores that are usable by behavior analytics tools. Such algorithms may benefit from the caching optimizations presented herein.

These are merely examples. Other aspects of these embodiments and other caching optimization embodiments are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. In some embodiments, one or more computers are partially or fully "air gapped" by reason of being disconnected or only intermittently connected to another networked device or remote cloud. In particular, caching optimization functionality taught herein could be installed on an air gapped system and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in dashed outline form in the Figures, or listed inside parentheses, to emphasize that they are not necessarily part of the illustrated operating environment or all embodiments, but may interoperate with items in the operating environment or some embodiments as discussed herein. It does not follow that items not in dashed outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
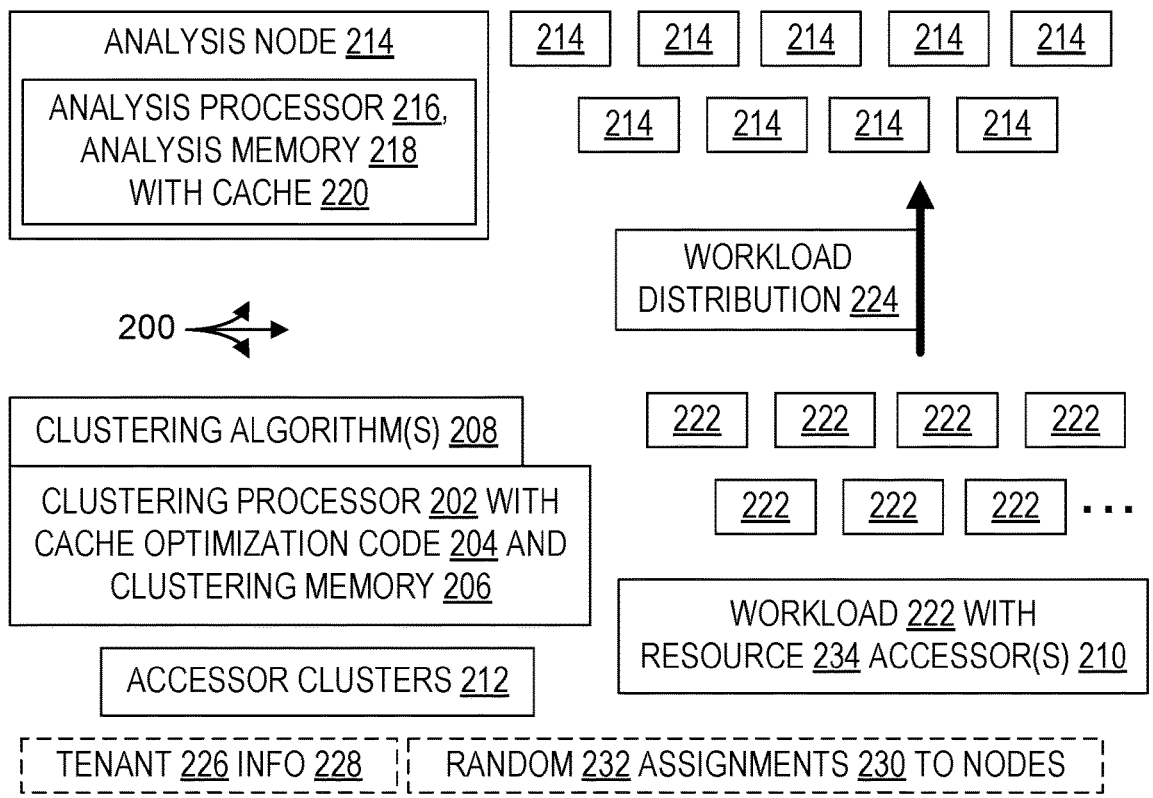
FIG. 2 is a block diagram illustrating some aspects of a distributed computing system.

FIG. 2 illustrates aspects of some enhanced distributed computing systems 200, which are systems 102 enhanced with at least some of the caching optimization functionality taught herein. In particular, the illustrated enhanced system 200 includes a clustering processor 202 configured with caching optimization code 204. In operation, the clustering processor 202 communicates with a clustering memory 206, e.g., the clustering memory 206 may contain or be used by caching optimization code 204 executed by the clustering processor 202. The clustering processor uses clustering algorithms 208 and decisions made by the caching optimization code 204 to form resource 234 accessors 210 (such as users 104) into accessor clusters 212.

Figure 8:
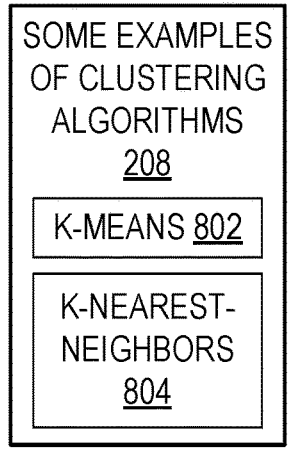
FIG. 8 is a diagram illustrating some examples of clustering algorithms.

As shown in FIG. 8, the one or more clustering algorithms 208 used in a given embodiment may include k-means 802 or k-nearest-neighbors 804, for example. Returning attention to FIG. 2, the resources 234 sought by resource accessors 210 may include any digital item or computing system component, e.g., an account, a file, a document, a link, an IP address, an API, a stream, a repository, a virtual device, and so on.

Accessor clusters are assigned to analysis nodes 214. Each analysis node includes an analysis processor 216 in operation with an analysis memory 218; the analysis memory 218 includes a node cache 220. Assigning the accessor clusters 212 to the analysis nodes 214 implicitly or explicitly assigns data 118 to the node caches 220, because a given analysis workload 222 will involve computations regarding resource accessors 210 and will tend to involve data 118 that is associated with those accessors 210.

A workload distribution 224 computed by the enhanced system assigns computational workloads 222 to analysis nodes 214. Assignments of workloads 222 to nodes 214 are made based (at least in part) on the assignment of accessor clusters 212 to the nodes 214. For instance, a workload 222 that involves an accessor A1 may be assigned to the same node 214 that was assigned the accessor cluster 212 that contains accessor A1.

In some embodiments, the assignment 230 of accessors 210 to nodes 214 avoids any reliance on cloud tenant 226 information 228, such as which accessor is an employee of, student at, or otherwise affiliated with, a given tenant 226. Assigning all accessors of a tenant to a single node would tend to overload that node, or to leave that node underutilized, because the number of accessors and the corresponding workloads will rarely be a close fit to the node's computing capability.

In some embodiments, the assignment 230 of accessors 210 to nodes 214 avoids using random 232 assignments. As discussed herein, random assignments miss caching optimization opportunities because not all accessors are equally likely to access a given resource 234.

Figure 3:
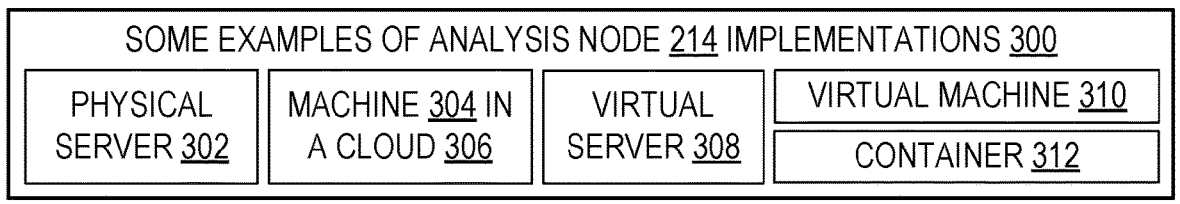
FIG. 3 is diagram illustrating some examples of analysis node implementation possibilities.

FIG. 3 illustrates several of the many possible implementations of analysis nodes 214. A given embodiment may use a single implementation, or may combine multiple kinds of implementations 300. The illustrated node 214 implementations include a physical server 302, a machine 304 (physical or virtual) in a cloud 306, a virtual server 308, a virtual machine 310, or a container 312. More generally, an implementation will include processing functionality, memory functionality, and workload distribution functionality to optimize caching, as taught herein.

Figure 4:
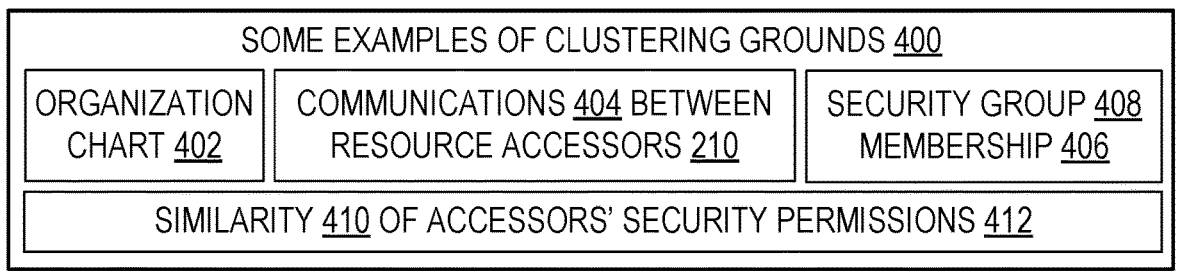
FIG. 4 is a diagram illustrating some examples of grounds on which clustering may be based in a distributed computing system.

FIG. 4 illustrates several grounds 400 that may be used to guide creation of accessor clusters 212. One ground is an organization chart 402, e.g., accessors who work in the same department (per the organization chart 402) may be placed in a cluster 212 corresponding to that department, while accessors working in another department are placed in another cluster which corresponds to that other department.

Another clustering ground illustrated in FIG. 4 is some or all of the electronic communications 404 between accessors. E.g., after calculating communication frequency (or size, or recency, or a combination thereof) for an accessor A1 and sorting the results, the top K accessors who communicated with A1 are placed in a cluster 212 with A1. K may be chosen to avoid overloading or underutilizing the computing capacity of the node that will be assigned to the cluster, bearing in mind that in general a node will have multiple assigned clusters in order to facilitate workload balancing between nodes.

Another clustering ground illustrated in FIG. 4 is membership 406 in a security group 408. Many file systems or operating systems permit or require definition of one or more security groups 408. Accessor clusters 212 may then be defined to favor putting members of a given security group 408 together in the same cluster 212. Clustering by security group may be subject in some cases to constraints such as a maximum cluster 212 size, or the placement of a particular accessor in only one cluster even though the accessor belongs to more than one security group.

Yet another clustering ground illustrated in FIG. 4 is similarity 410 of accessor security permissions 412. Many if not all file systems permit or require definition of one or more security permissions 412, e.g., using the chmod command in *nix environments and using Security tab properties in Microsoft Windows® environments (mark of Microsoft Corporation). Security group 408 memberships 406 may also be considered a special case or aspect of security permissions 412 in some embodiments. When security permissions 412 are represented in vector form, their similarity 410 may be computed using a cosine similarity metric, for example.

Figure 5:
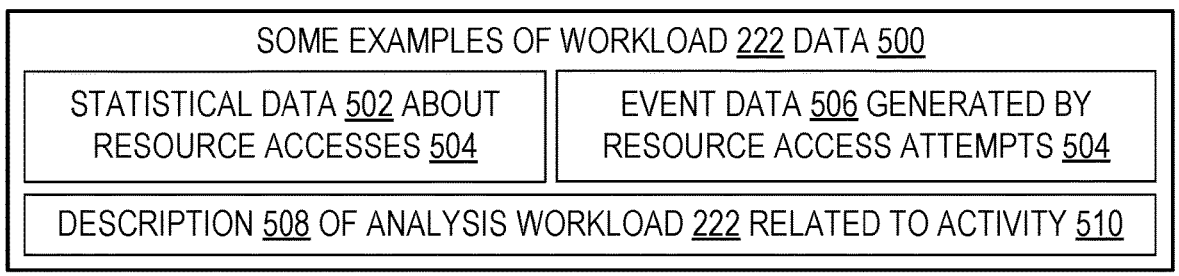
FIG. 5 is a diagram illustrating some examples of different kinds of analysis workload data.

FIG. 5 shows some examples of data 118, 500 that is particularly relevant to analysis workloads 222 in some embodiments. In some cases, processing a workload 222 includes performing computations that use or create statistical data 502 about resource accesses 504, e.g., summarized, aggregated, or averaged data. Unless otherwise stated, accesses 504 herein include both successful accesses (e.g., logged in) and unsuccessful access attempts (e.g., attempted login failed). In some cases, processing a workload 222 includes computations that use or create event data 506, which may also be called "raw" data or "raw event" data to distinguish it from statistical data 502. For instance, a workload performance may select a user, gather behavioral information about the user, determine the user's peers, gather behavioral information about the peers (possibly based on identification of peers by collaborative filtering), and then use machine intelligence, statistical analysis, or other processing to assess whether the user's behavior is abnormal relative to the behavior of the user's peers. Workloads may then also generate security alerts, fraud alerts, or other alerts.

Some workloads 222 include or use a textual or data structural description 508 of the workload or of the accessor activity 510 underlying the workload. Activity 510 includes accesses 504, and may also include other events such as changes in security group membership 406 and communications 404. In some embodiments, a description 508 identifies the accessors 210 which are implicated 714 in the workload. For example, a workload 222 to compute an anomalousness score, for resource accesses by an accessor A1 relative to accesses 504 by accessors A2, A5, and A7, may have a description 508 indicating that the workload implicates A1, A2, A5, and A7.

Figure 6:
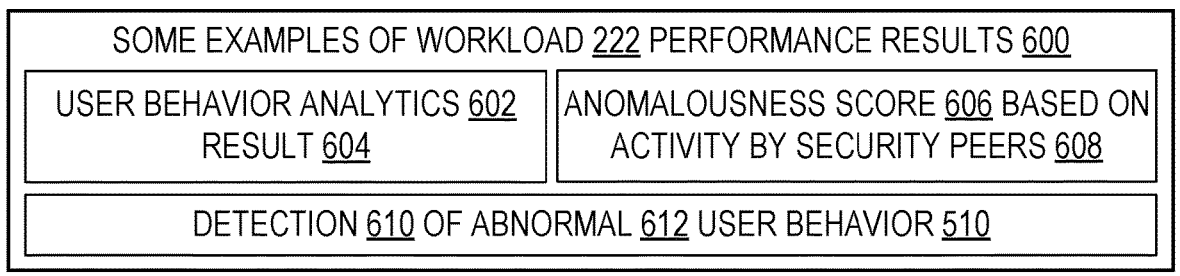
FIG. 6 is a diagram illustrating some examples of different kinds of results that may be produced by computationally performing an analysis in a distributed computing system.

FIG. 6 illustrates some results 600 that may be produced by a given workload or collection of related workloads 222. One illustrated result is a user behavior analytics 602 (UBA or UEBA) result 604, such as a similarity score for the respective behaviors of two accessors A1 and A2. Another illustrated result is an anomalousness score 606 for accessor activity in view of the activity 510 of the accessor's security peers 608. Another illustrated result is the detection 610 of user behavior that is deemed abnormal 612.

In particular, some embodiments use or provide a caching optimization functionality-enhanced system, such as system 200 or another system 102 that is configured as a performance-optimized computing system as taught herein. The enhanced system 200 includes a set of N analysis nodes 214, N being at least 2, with each analysis node including an analysis memory 218 and an analysis processor 216, the analysis memory including a cache 220. The enhanced system 200 also includes a clustering processor 202 in operable communication with a clustering memory 206. The clustering processor is configured to perform steps for performance optimization which include (a) clustering resource accessors 210 into at least N accessor clusters 212, (b) assigning each accessor cluster 212 to an analysis node 214, and (c) distributing analysis workloads 222 among the analysis nodes 214, wherein each analysis workload AWi is distributed to be performed on an analysis node ANj based at least on (c1) identifying an accessor Ak in AWi and (c2) finding the same accessor Ak in an accessor cluster ACm that is assigned to ANj. Designations such as "AWi", "ANj", "Ak", and "ACm" used herein are for convenience only and do not limit the embodiments or claims to implementations that use the same designations. This system 200 optimizes analysis node cache performance while avoiding distributing analysis workloads based on assigning tenants 226 to analysis nodes and while avoiding distributing analysis workloads based on assigning users randomly 232 to analysis nodes.

In some embodiments, each analysis node 214 includes at least one of the following: a physical server 302, a virtual server 308, a virtual machine 310, a container 312, or a machine in a cloud 306.

In some embodiments, clustering resource accessors 210 includes at least one of the following: clustering based at least partially on an organization chart 402, clustering based at least partially on communications 404 between accessors, clustering based at least partially on accessor membership 406 in a security group 408, or clustering based at least partially on similarity of accessor security permissions 412.

In some embodiments, the system 200 clusters resource accessors 210 into at least five times N accessor clusters 212. For example, if a distributed computing system has seven nodes 214 available to use in processing workloads, then clustering would provide at least five times seven (thirty-five) clusters 212 to distribute among the seven nodes. This allows better matching between node capacity and the expected workloads that will be distributed based on the accessor cluster distribution.

In some embodiments, the clustering processor 202 could include the same physical hardware as an analysis processor 216, or not. That is, one of the nodes 214 might do both clustering and behavior analysis. Alternatively, the clustering could be done on a different node than the analysis. Thus, in some embodiments a physical processing unit 110 operates both as part of one of the analysis processors 216 and as part of the clustering processor 202.

In some embodiments, the workloads 222 include statistics 502 or raw events 506 about resource access 504. Thus, in some embodiments, for at least one i and j, performing the analysis workload AWi on the analysis node ANj includes at least one of the following: processing statistical data 502 about resource accesses, with the statistical data cached on the analysis node ANj, or processing event data 506 generated by resource access attempts, with the event data cached on the analysis node ANj.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, sequences, data structures, or functionalities for instance, and may otherwise depart from the examples provided herein.

Processes (a.k.a. Methods)

Figure 7:
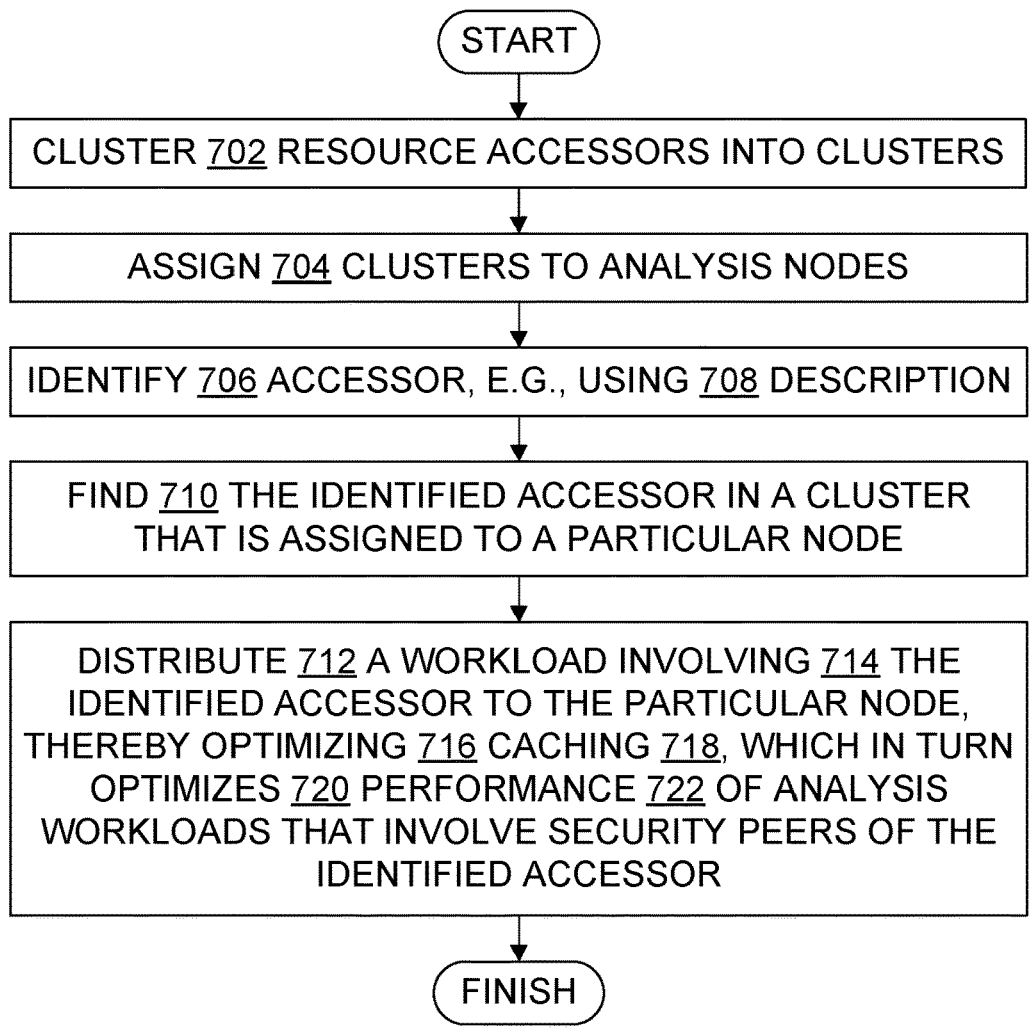
FIG. 7 is a flowchart illustrating steps in some caching performance optimization methods.
Figure 9:
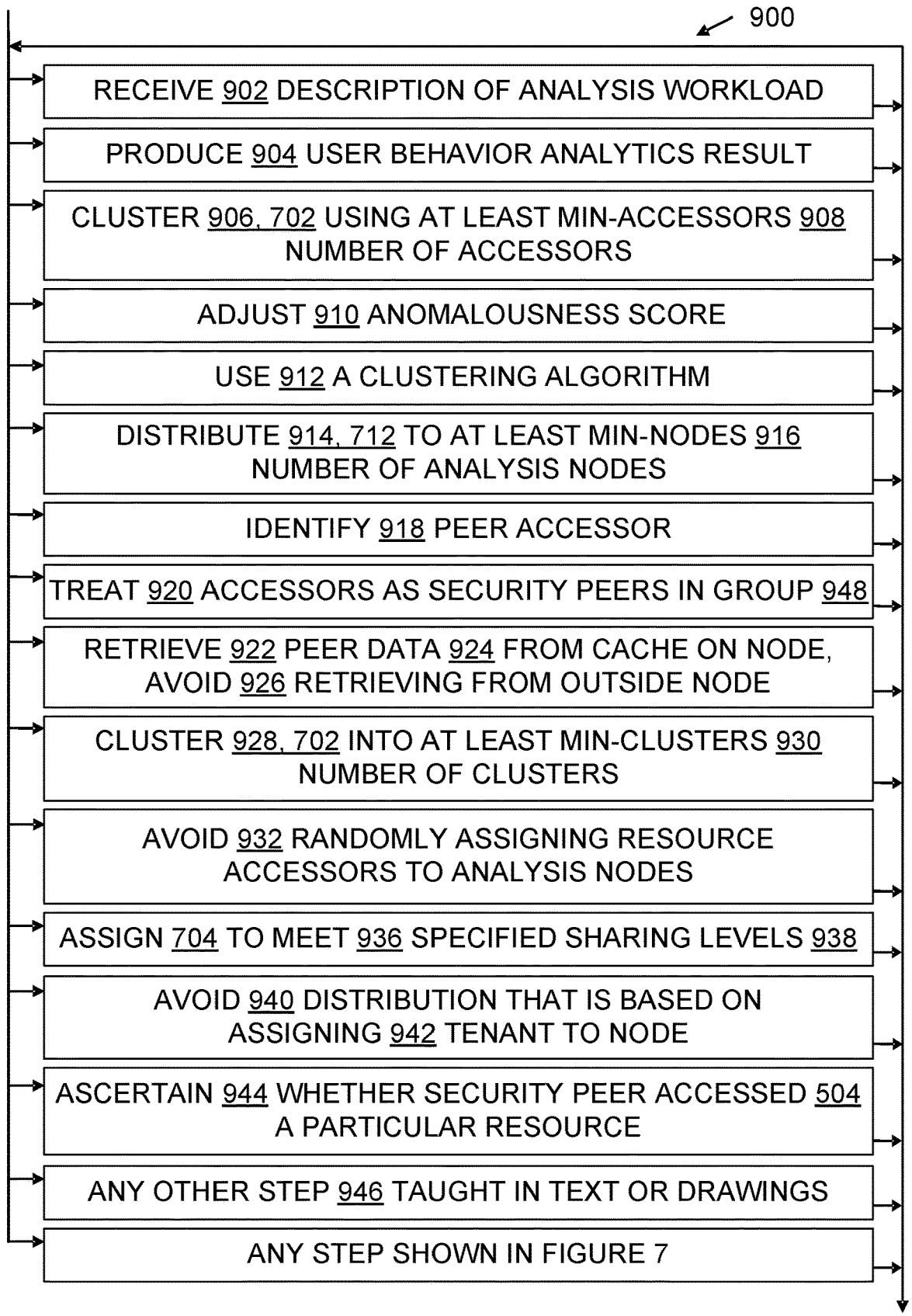
FIG. 9 is a flowchart further illustrating steps in some caching performance optimization methods.

FIG. 7 illustrates families of methods 700 that may be performed or assisted by an enhanced system, such as system 200, or another functionality-enhanced system as taught herein. FIG. 9 further illustrates performance optimization methods (which may also be referred to as "processes" in the legal sense of that word) that are suitable for use during operation of a system which has innovative functionality taught herein. FIG. 9 includes some refinements, supplements, or contextual actions for steps shown in FIG. 7. FIG. 9 also incorporates steps shown in FIG. 7.

Technical processes shown in the Figures or otherwise disclosed will be performed automatically, e.g., by a task scheduler, load balancer, or other workload 222 distributor running software 204, unless otherwise indicated. Processes may also be performed in part automatically and in part manually to the extent action by a human administrator or other human person is implicated, e.g., in some embodiments a developer or administrator may specify the number of nodes 214 or the ratio between clusters 212 and nodes 214. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 7 and 9. Steps may be performed serially, in a partially overlapping manner, or fully in parallel. In particular, the order in which control flowchart 700 action items or control flowchart 900 action items are traversed to indicate the steps performed during a process may vary from one performance of the process to another performance of the process. The chart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for software performance optimization, including the following steps performed automatically: clustering 702 resource accessors 210 into at least N accessor clusters 212, at least a majority of the resource accessors in each cluster being security peers 608 of one another; assigning 704 each accessor cluster to an analysis node 214 in a set of N analysis nodes; receiving 902 a description DAWi 508 of an analysis workload AWi 222, the analysis workload AWi related to resource access activity 510 by at least one accessor; identifying 706 a resource accessor Ak using the description DAWi; finding 710 the same resource accessor Ak in an accessor cluster ACm that is assigned to an analysis node ANj; and in response to the finding, distributing 712 analysis workload AWi to the analysis node ANj, thereby optimizing 720 performance 722 of analysis workloads which involve security peers of accessor Ak.

In some embodiments, the clustering 702 is done before the event processing 722. In some, clusters 212 can be re-calculated on the fly, e.g., when similarity 410 values or peers 608 change. After re-clustering, workloads may be routed 712 to analysis nodes 214 based on the revised clusters 212.

The analysis nodes may perform various kinds of computations using different kinds of data 118. In some embodiments that include performing the analysis workload AWi on the analysis node ANj, the performing includes at least one of the following: producing 904 a user behavior analytics result 604; adjusting 910 an anomalousness score 606 for activity by resource accessor Ak, based at least in part on activity by security peers of Ak; or detecting 610 an abnormal user behavior 612.

The benefits of caching optimization may be evident in various situations. For example, when an embodiment performs 722 the analysis workload AWi on the analysis node ANj, that performing may include identifying 918 a resource accessor Ak-peer, where Ak-peer is a security peer of resource accessor Ak, and retrieving 922 data Dk-peer about accessor Ak-peer from a data cache on the node ANj, thus avoiding 926 retrieving data Dk-peer from a location outside the node ANj.

Accessors 210 may be clustered 702 in various ways, some of which involve defining 920 accessors that are security peers 608 of one another. For example, in some embodiments, clustering 702 resource accessors includes at least one of the following: treating 920 as security peers 608 accessors who attempted to access the same resource as one another, treating 920 as security peers 608 accessors who have similar resource access behavior, treating 920 as security peers 608 accessors who have similar security permissions, or defining 702 clusters based at least in part on security peer 608 groups. As particular non-limiting examples of these possibilities, accessors who each accessed a certain shared file 234 may be treated 920 as security peers of one another, accessors whose vectorized behaviors 510 are within a threshold cosine similarity distance of each other may be treated 920 as security peers of one another, accessors whose security permissions 412 all include secret level access but exclude top secret clearance may be treated 920 as security peers of one another, and accessors who all belong to the same workgroup W under decisions by a network administrator may be treated 920 as security peers of one another.

In some embodiments, clustering 702 resource accessors includes at least one of the following: using 912 a k-means clustering algorithm 802, 208, or using 912 a k-nearest-neighbors clustering algorithm 804, 208. The clustering algorithm 208 may be applied to individual accessors 210, or to groups of accessors, such as security peer groups 948 which are defined by treating 920 certain accessors as security peers 608. Security peer groups 948 are not necessarily the same as security groups 408, since security groups are typically defined expressly by an administrator but peer group 948 definitions depend on which criteria are applied to treat 920 accessors as security peers 608.

In some embodiments, an embodiment clusters 702 resource accessors 210 into at least ten times N accessor clusters 212. For example, if a distributed computing system has thirteen nodes 214 available to use in processing workloads, then clustering would provide at least ten times thirteen (one hundred thirty) clusters 212 to distribute 712 among the thirteen nodes. This allows better matching between node capacity and the expected workloads.

Caching optimizations taught herein may be employed in distributed computing systems of various sizes, including in production scenarios. For example, in some production embodiments the method clusters 702 at least one thousand resource accessors 210 into at least twenty accessor clusters 212, and distributes 712 analysis workloads 222 to at least ten analysis nodes 214.

As discussed, caching optimizations taught herein may be employed in ways that avoid 932 randomly 232 assigning resource accessors 210 to analysis nodes 214. However, some embodiments may randomly assign accessor clusters 212 to nodes 214; subsequently assigning workloads based on whether workloads implicate 714 accessors is not considered a random assignment per se of accessors to nodes.

A caching optimization is not necessarily perfect; optimizing may achieve perfect efficiency but does not always guarantee it. Some embodiments, for example, meet 936 specified sharing levels 938 by assigning at least fifty percent of resource accessors 210 to the same analysis node 214 as at least sixty percent of their security peers 608. Similarly, some embodiments reduce cache misses to no more than twenty percent of cache accesses during a given execution 722 of a workload 222. In some embodiments, optimization is present when at little as forty percent of a peer group 948 are assigned to the same node 214. In some embodiments, optimization efficiency may be measured relative to cache utilization under an actual or hypothetical naïve random distribution of resource accessors 210 among nodes 214.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as caching optimization code 204, resource accessor clusters 212, workload distributions 224, security peer groups 948, workload descriptions 508, and clustering algorithm 208 implementations, in the form of data 118 and instructions 116, read from a removable storage medium 114 and/or another source such as a network connection, to form a configured storage medium. The configured storage medium 112 is capable of causing a computer system 102 to perform technical process steps for workload performance optimization via caching optimization, as disclosed herein. The Figures thus help illustrate configured storage media embodiments and process (a.k.a. method) embodiments, as well as system and process embodiments. In particular, any of the process steps illustrated in FIG. 7 or 9, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for software performance optimization. This method includes: clustering 702 resource accessors into at least N accessor clusters, where N is at least three; assigning 704 each accessor cluster to an analysis node in a set of N analysis nodes; identifying 706 a resource accessor Ak that is associated with an analysis workload AWi; finding 710 the same resource accessor Ak in an accessor cluster ACm that is assigned to an analysis node ANj; and distributing 712 analysis workload AWi to the analysis node ANj, thereby optimizing 720 performance 722 of analysis workloads which involve peers of accessor Ak.

Some embodiments do not base workload distribution on which tenants 226 are associated with which nodes 214. Thus, some embodiments avoid 940 assigning 230 resource accessors to analysis nodes by assigning tenants to analysis nodes when resource accessors are affiliated with tenants. Instead, accessors are clustered 702 without regard to accessor tenant affiliations, and then clusters are assigned 704 to nodes.

As another example of situations in which teachings herein may beneficially optimize caching, some embodiments perform 722 a respective analysis workload on each analysis node, and said performing includes identifying 706 a resource accessor which is a security peer of a resource accessor that belongs to a cluster assigned to the analysis node, and retrieving 922 data about the security peer from a data cache 220 on the analysis node instead of 926 retrieving the data from a location outside the analysis node.

In some embodiments, distributing 712 analysis workload AWi to the analysis node ANj includes caching 718 on ANj statistical data 502 about resource access attempts 504 by resource accessor Ak and statistical data 502 about resource access attempts 504 by at least one security peer 608 of Ak.

In some embodiments, performing 722 analysis workload AWi on the analysis node ANj includes determining that resource accessor Ak attempted to access a resource Rnew that was not previously accessed by Ak, and ascertaining 944 whether one or more security peers of Ak have accessed Rnew.

Additional Details, Examples, and Observations

Additional support for the discussion above is provided below. For convenience, this additional support material appears under various headings. Nonetheless, it is all intended to be understood as an integrated and integral part of the present disclosure's discussion of the contemplated embodiments.

Some embodiments involve optimizing cache hits, possibly using peer group clustering. One of skill may acknowledge that optimizing cache usage may be very important in a big data infrastructure. In some cybersecurity solutions, for example, caches are accessed based on properties on a certain event. Often correlations between these properties can be found within big data, such as correlations of users and resources, when users usually login or interact with a certain set of resources. In the cybersecurity realm in order to profile user behavior, one may therefore gather not just the user activities but also information about the user's peers or other collaborators, in order to build a broader baseline of the user's behavior.

When a single computer instance can't handle all of the arriving events in a cloud-based environment, some sort of partitioning among nodes 214 is useful. Such a partitioning should keep the resulting partitions small enough to be divided across several computer instances, but big enough to optimize cache access across correlated properties. Clusters 212 or sets of clusters 212 are examples of such partitions, but other partitions may also be considered.

For instance, partitioning by tenant 226 (e.g., a company) may be considered ideal in terms of cache access, when all of the users in the tenant access resources on the same network. But such a partition may well be too big for one computer instance to process. Partitioning by user may be considered ideal in terms of load distribution flexibility, but is problematic in terms of resource cache access, because computations in the context of a resource will likely be spread across several computer instances, depending on which users accessed this resource. Partitioning by user is also problematic in terms of user peers' cache access, because the peers might reside in different partitions than one another, which leads to a low utilization of the cache (evident in cache misses).

Some embodiments taught herein rely on peer clustering for optimizing cache access. Some start with a set of users in an organization, and cluster them into N distinct groups based on their resource access patterns, user similarity, or any other fitting metric. N is chosen based on the number of partitions needed to distribute the load. The resulting peer partitions are then used to partition the events arriving at the system for analysis. This may prove beneficial in at least two ways. First, on average this partitioning reduces cache misses because users in a certain group access the same resources by definition. Second, this partitioning approach helps profile users, in the context of their peers, with less cache misses, as most of the peers are in the same partition. These benefits are not limited to the context of user behavior analysis; they may also be obtained for any security product which handles data involving users' behavior or leverages peers' information. Caching optimizations may help security products reduce the costs and load on the cloud infrastructure, and improve the performance of those products.

In some embodiments, calculating the peer group 948 of a certain entity includes or uses computation of a similarity metric 410 between the entity and at least one other relevant entity. Some embodiments define the top N entities with the highest similarity metric value as the peer group. Clustering 702 may use similarity metrics as well. In some embodiments, clustering 702 is based on peer groups, e.g., in a process that includes computing metrics, then forming peer groups, and then clustering. In general, clusters 212 are not the same as peer groups 948, because peer groups are defined for each entity whereas clusters are formed globally over a set of entities, e.g., over all of the users in a tenant.

In some embodiments, peer group membership is not commutative and also is not transitive. That is, "B is in A's per group" does not always mean "A is in B's peer group". Also, "A is in B's peer group" and "B is in C's peer group" does not always mean "A is in C's peer group".

As further illustration of peer groups 948, assume a tenant of interest has eight users, designated here for convenience as A, B, C, D, E, F, G, and H. A-H are users in this example, but they could be any entity (machine, URL, . . . ) that operates as a resource accessor 210. Assume peer groups are of size two, so each user has at most two peers. Further assume these are the peer groups:

| User | Peer group list (order is significant) |
|---|---|
| A | B, C |
| B | A, D |
| C | A, B |
| D | A, B |
| E | A, F |
| F | G, H |
| G | H, D |
| H | G |

In this example, the peer group for each user is decided by computing a similarity metric between the users, based on security group membership (or any other method). After the metric is formed, this computation takes as peers those within a certain distance threshold, limiting the number taken as peers to two (in this example; peer group size may vary).

Next the computation will form peer clusters. As opposed to peer groups 948, where every user has a list of other users, peer clusters 212 are global in the sense that if a system is configured to have three clusters, then only three clusters 212 are defined. In this example, the three clusters are {A, B, C}, {G, H, D}, and {E, F}. The clusters are computed 702 in this example by applying k-means 802 with k=3, over the similarity metric described above. Notice that this clustering is not completely consistent with the peer grouping: user B has user D in their peer group, but not in the cluster.

Finally, assume there are two computation nodes 214, designated here as N1 and N2. Then N1 gets 704 clusters {A, B, C} and {E, F}, and N2 gets 704 cluster {G, H, D}. N1 and N2 can perform several tasks 222 using these clusters. Some workload performance includes retrieving information about the peers themselves, e.g., when N1 processes data with an event from user A, it retrieves the history of A's peers B and C. Since they are on the same cluster, the retrieval is likely to be faster than would occur under a random assignment of users onto nodes. However, even if N1 and N2 do work that is not directly related to user peers, e.g., work performed without retrieving the peers' histories, it is likely that users A, B, and C each access the same resource R (at least, this likelihood is presumed here). Therefore, retrieving information about R is relatively fast because R's information is cached in the node assigned to A, B, and C.

One of skill will acknowledge in view of the teachings herein that an embodiment may also optimize analysis workloads that are unrelated to the security peers per se. If users belonging to the same peer group access the same resources, then it's beneficial to keep data about these common resources in the cache of the node dealing with this specific cluster. Even if analysis does not perform work directed at peers per se (e.g., enriching an event with peer data, or triggering an alert based on peer history), an embodiment may benefit from caching optimizations based on such clustering.

In some embodiments, clusters 212 are computed based directly on similarity between users 104, 210. That is, the clusters are computed 702 without using groups 948. In other embodiments, clustering 702 does rely in part on peer grouping 948.

Figure 10:
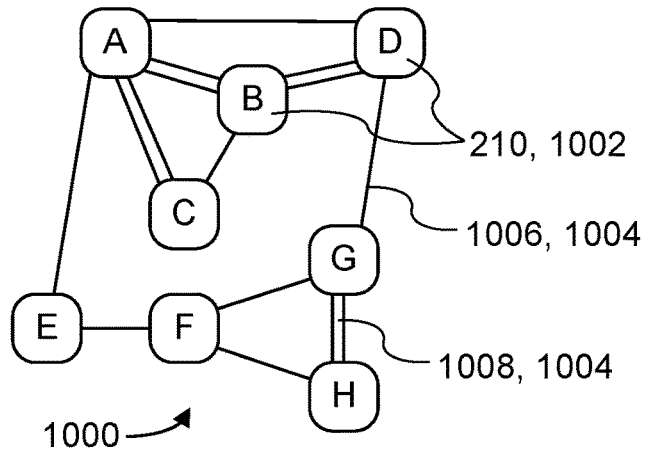
FIG. 10 is a diagram illustrating security peer relationships between resource accessors.

FIG. 10 helps illustrate a way to compute the three clusters 212 of the example above, using peer groups. Users 104, 210 are represented as vertexes 1002 in a graph 1000, with peer relationships represented by links 1004 in the graph 1000. In this example, the peer relationship is not necessarily symmetric; Ai a peer of Aj does not imply Aj is a peer of Ai. For instance, in this example A is a peer of E but E is not a peer of A. In FIG. 10, a single link 1006 between two users indicates that one user is a peer of the other, but not vice versa, while a double link 1008 indicates that each user is a peer of the other.

In this context, clustering 702 may be done as follows.

Find symmetric pairs—pairs of users who are peers of each other in both directions. For instance, A has peer B and B has peer A, so one such symmetric pair is [A, B]. Other symmetric pairs are [A, C], [B, D], and [G, H].

Pick a user who appears in at least one symmetric pair, such as A. Make a cluster with the users of as many symmetric pairs including A as possible, up to some max on the number of users per cluster. So, if the max users per cluster is three, the first cluster would include {A, B, C}.

Pick a user not yet assigned to a cluster, who also appears in one of the symmetric pairs. Favor users whose symmetric partner is also not yet clustered. This would pick G or H. D is not yet clustered, but its symmetric partner B is clustered. Make a cluster with the users whose symmetric pair was not yet clustered; this puts G and H into the second cluster. There is room for one more user in the second cluster (max of three users per cluster in this example), so add in D because there is a one-way peer relationship between G and D. So, the second cluster is {G, H, D}.

At this point the desired number of clusters is three and there are only two users left, so they go in the third cluster: {E, F}.

Technical Character

The technical character of embodiments described herein will be apparent to one of ordinary skill in the art, and will also be apparent in several ways to a wide range of attentive readers. Some embodiments address technical activities such as processing statistical data 502 or event data 506 or both, analyzing user behavior 510 using machine intelligence or collaborative filtering or performing 722 other computations by execution of analysis workloads 222, distributing 712 workloads to computational nodes 214, and managing cache memory in a computer system, which are each an activity deeply rooted in computing technology. Some of the technical mechanisms discussed include, e.g., caches 220, clusters 212, node 214 implementations 300, workload descriptions 508, security groups 408, peer groups 948, similarity metrics 410, clustering algorithms 208, and caching optimization code 204. Some of the technical effects discussed include, e.g., increased cache hits and optimized workload performance in a distributed computing system. Thus, purely mental processes are clearly excluded. Other advantages based on the technical characteristics of the teachings will also be apparent to one of skill from the description provided.

Some embodiments described herein may be viewed by some people in a broader context. For instance, concepts such as access, analysis, data, distribution, efficiency, and security may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to reduce cache misses in a distributed computing system. Other configured storage media, systems, and processes involving access, analysis, data, distribution, efficiency, or security are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, software processes, development tools, identifiers, data structures, data organizations, notations, control flows, pseudocode, naming conventions, or other specific choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP: hypertext transfer protocol
HTTPS: hypertext transfer protocol (secure)
IaaS or IAAS: infrastructure-as-a-service
IMAP: internet message access protocol
IoT: Internet of Things
LAN: local area network
OS: operating system
PaaS or PAAS: platform-as-a-service
POP: post office protocol
RAM: random access memory
ROM: read only memory
SMTP: simple mail transfer protocol
TCP/IP: transmission control protocol/internet protocol
TPU: tensor processing unit
UDP: user datagram protocol
UEFI: Unified Extensible Firmware Interface
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions.

The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource.

Attempted access may be explicitly distinguished from actual access, but "access" without the "attempted" qualifier includes both attempted access and access actually performed or provided. For more, see the discussions of access 504 elsewhere herein.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein.

Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Software performance optimization operations such as clustering 702 resource accessors, assigning 704 clusters 212 to processing nodes 214, distributing workloads 222 to nodes 214, and many other operations discussed herein, are understood to be inherently digital. A human mind cannot interface directly with a CPU or other processor, or with RAM or other digital storage, to read and write the necessary data to perform the performance optimization steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, adjusting, analyzing, ascertaining, assigning, caching, clustering, distributing, finding, hitting, identifying, missing, optimizing, performing, producing, receiving, treating, using (and accesses, accessed, adjusts, adjusted, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users, e.g., software developers, employees, members of the general public
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
200 system enhanced by caching optimization functionality in any form described herein
202 clustering processor; may include one or more processors 110
204 cache optimization software (a.k.a. "code"); may also be referred to as "caching optimization code"
206 clustering memory; an example of memory 112
208 clustering algorithm
210 resource accessor, e.g., a user 104 or other entity that attempts to access a resource 234; in particular, in some embodiments a resource accessor may be a human user, but may also be a software process
212 cluster of two or more accessors 210
214 analysis node, e.g., a system 102 configured to perform user behavioral analysis or other processing as part of a distributed computing system
216 analysis processor; may include one or more processors 110
218 analysis memory; an example of memory 112
220 cache; an example of memory 112
222 analysis workload, e.g., a set of computations to be performed as part of an analysis that is performed by processing in a distributed computing system
224 distribution of workloads among nodes
226 cloud tenant
228 information about a cloud tenant
230 assignment of accessor 210 to node 214; may also be viewed as an assignment of the node to the accessor
232 random or pseudorandom assignment of accessors 210 to nodes 214; reference numeral 232 also refers to an act of randomly assigning accessors to nodes
234 resource, e.g., digital artifact
300 implementation of an analysis node; may be viewed as an example of how the analysis node functionality may be implemented
302 physical server computer
304 physical or virtual computer; also referred to as a "machine"
306 cloud; may also be referred to as a "cloud environment" or "cloud computing"
308 virtualized server computer
310 virtual machine, e.g., a computing construct which provides hardware virtualization and includes an operating system; may be a virtual server, virtual router, virtual firewall, etc.
312 container, e.g., a computing construct which provides user space virtualization and does not itself include an operating system but is nonetheless reliant upon an operating system to execute
400 ground for clustering accessors
402 organizational chart
404 communications between accessors, whether via HTTP, HTTPS, TCP/IP, UDP, POP, IMAP, SMTP, or another digital communications protocol
406 membership in a security group
408 security group
410 similarity; also refers to similarity metric 412 security permission(s)
500 kinds of workload data; also refers to workload data, which is an example of data 118
502 statistical data created from multiple data events or multiple individual instances of data
504 access or attempted access to a resource 234; resource access may include, e.g., logons (interactive, remote or other authentication flows), data operations (editing a document, sharing a link, etc.) or other events a system logs or responds to, or prohibits or allows
506 event data, generated as a result of or otherwise documenting a single event in a computing system
508 workload description, e.g., in a data structure
510 accessor activity
600 workload computational result
602 user behavior analytics, e.g., UBA or UEBA; may also be referred to as "behavior analytics", "behavior analysis", or "behavioral analysis"
604 computational result pertaining to behavior analytics 602
606 anomalousness score
608 security peer
610 detection of an abnormality
612 abnormal user behavior
700 flowchart; 700 also refers to performance optimization methods illustrated by or consistent with the FIG. 7 flowchart
702 cluster accessors
704 assign clusters to nodes; may also be viewed as assigning nodes to clusters
706 identify an accessor, e.g., by checking a list of accessors
708 use a workload description
710 find an accessor in a cluster, e.g., by checking a list of accessors
712 distribute a workload, e.g., by matching a workload to a node in a work scheduling data structure
714 refer to, implicate, or otherwise involve an accessor, e.g., compute using data related directly to the accessor, such as events performed by the accessor or security permissions of the accessor
716 optimize caching; this may inherently also optimize workload performance
718 perform caching, e.g., by placing data in a cache or retrieving data from a cache
720 optimize workload performance
722 workload performance; may also be referred to as workload "execution" or as performing "analysis"
802 k-means algorithm; also refers to computing functionality which implements a k-means algorithm
804 k-nearest-neighbors algorithm; also refers to computing functionality which implements a k-nearest-neighbors algorithm
900 flowchart; 900 also refers to performance optimization methods illustrated by or consistent with the FIG. 9 flowchart (which incorporates the steps of FIG. 7)
902 receive a workload description, e.g., by placing it in working memory
904 computationally produce a behavior analytic result
906 cluster using at least a minimum number of accessors; this is an example of clustering 702
908 minimum number of accessors
910 adjust (create or update) an anomalousness score
912 computationally use a clustering algorithm
914 distribute workloads to at least a minimum number of nodes 214; this is an example of distributing 712
916 minimum number of nodes
918 identify a peer of a given accessor
920 treat accessors as security peers; this has the effect of defining a security peer group
922 retrieve data, e.g., over a network link or by reading from memory
924 peer data, that is, data pertaining to a peer, such as the peer's behavior history or security group membership; this is an example of data 118
926 avoid retrieving data onto a given node from a location outside the given node
928 cluster accessors into at least a minimum number of clusters; this is an example of clustering 702
930 minimum number of clusters 212
932 avoid randomly assigning accessors to nodes
936 meet a specified sharing level in the assignment of accessors to nodes
938 sharing level in the assignment of accessors to nodes
940 avoid a workload distribution that depends on assigning 942 a tenant as a whole to a node 214
942 assign a tenant as a whole to a node 214; may also be viewed as assigning a node to a tenant
944 ascertain access activity by a peer
946 any step discussed in the present disclosure that has not been assigned some other reference numeral
948 security peer group; also referred to simply as a "peer group"

CONCLUSION

In short, the teachings herein provide a variety of computing system 102 performance optimization functionalities which enhance the performance of applications 124 that use cache memory 112. Distributed computing system (DCS) 102 performance is enhanced by caching optimizations 204, 900. The DCS includes nodes 214 with local caches 220. Resource 234 accessors 210 such as users 104 are clustered 702 based on their similarity 410, and the clusters 212 are assigned 704 to nodes 214. Then processing workloads 222 are distributed 712 among the nodes 214 based at least in part on which accessors 210 the workloads 222 implicate 714, and based at least in part on which nodes 214 were assigned 704 to those accessors' clusters 212. Clustering 702 may place security peers 608 together in a cluster 212, and hence place peers 608 together on a node 214. Security peers 608 tend to access 504 the same resources 234, so those resources 234 will more often be locally cached 718, improving 716, 720 performance 722. Workloads 222 implicating peers 608, 210 also tend to access 504 the same resources 234, such as peers' behavior 510 histories 506, so those resources 234 will likewise tend to be cached 718 locally, thus optimizing 720 performance 722 as compared for example to randomly 232 assigning accessors 210 to nodes 214 without clustering 702 and without regard to security peer 608 groupings 948.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into software. User behavioral data gathering and processing should also be compliant with all applicable privacy policies, contractual provisions, regulations, and laws. In particular, users should be appropriately notified when user events are logged and be informed that such logs are being used to enhance cybersecurity, as appropriate under the circumstances. Use of the tools and techniques taught herein is compatible with use of such controls, compliance, and notifications.

Although Microsoft technology is used in some motivating examples, the teachings herein are not limited to use in technology supplied or administered by Microsoft. Under a suitable license, for example, the present teachings could be embodied in software or services provided by other cloud service providers or other development environment providers or other runtime providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, minimums, maximums, percentages, or comparisons, or to specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A performance-optimized computing system, comprising:
    a set of N analysis nodes, N being at least 2, each analysis node including an analysis memory and an analysis processor, the analysis memory including a cache;
    a clustering processor in operable communication with a clustering memory, the clustering processor configured to perform steps for performance optimization which include (a) clustering resource accessors into at least N accessor clusters, (b) assigning each accessor cluster to an analysis node, and (c) distributing analysis workloads among the analysis nodes, wherein each analysis workload AWi is distributed to be performed on an analysis node ANj based at least on (c1) identifying an accessor Ak in AWi and (c2) finding the same accessor Ak in an accessor cluster ACm that is assigned to ANj;
    whereby the system optimizes analysis node cache performance while avoiding distributing analysis workloads based on assigning tenants to analysis nodes and while avoiding distributing analysis workloads based on assigning users randomly to analysis nodes.

2. The system of claim 1, wherein each analysis node comprises at least one of the following: a physical server, a virtual server, a virtual machine, a container, or a machine in a cloud.

3. The system of claim 1, wherein clustering resource accessors comprises at least one of the following:
    clustering based at least partially on an organization chart;
    clustering based at least partially on communications between accessors;
    clustering based at least partially on accessor membership in a security group; or
    clustering based at least partially on similarity of accessor security permissions.

4. The system of claim 1, wherein the system clusters resource accessors into at least five times N accessor clusters.

5. The system of claim 1, wherein a physical processing unit operates both as part of one of the analysis processors and as part of the clustering processor.

6. The system of claim 1, wherein for at least one i and j, performing the analysis workload AWi on the analysis node ANj includes at least one of the following:
    processing statistical data about resource accesses, the statistical data cached on the analysis node ANj; or
    processing event data generated by resource access attempts, the event data cached on the analysis node ANj.

7. A method of software performance optimization, the method comprising:
    clustering resource accessors into at least N accessor clusters, at least a majority of the resource accessors in each cluster being security peers of one another;
    assigning each accessor cluster to an analysis node in a set of N analysis nodes;
    receiving a description DAWi of an analysis workload AWi, the analysis workload AWi related to resource access activity by at least one accessor;
    identifying a resource accessor Ak using the description DAWi;
    finding the same resource accessor Ak in an accessor cluster ACm that is assigned to an analysis node ANj; and
    in response to the finding, distributing analysis workload AWi to the analysis node ANj, thereby optimizing performance of analysis workloads which involve security peers of accessor Ak.

8. The method of claim 7, further comprising performing the analysis workload AWi on the analysis node ANj, wherein said performing includes at least one of the following:
    producing a user behavior analytics result;
    adjusting an anomalousness score for activity by resource accessor Ak, based at least in part on activity by security peers of Ak; or
    detecting an abnormal user behavior.

9. The method of claim 7, further comprising performing the analysis workload AWi on the analysis node ANj, wherein said performing includes:
    identifying a resource accessor Ak-peer, where Ak-peer is a security peer of resource accessor Ak; and
    retrieving data Dk-peer about accessor Ak-peer, data DK-peer retrieved from a data cache on the node ANj, and avoiding retrieving data Dk-peer from a location outside the node ANj.

10. The method of claim 7, wherein clustering resource accessors comprises at least one of the following:
    treating as security peers accessors who attempted to access the same resource as one another;
    treating as security peers accessors who have similar resource access behavior;
    treating as security peers accessors who have similar security permissions; or
    defining clusters based at least in part on security peer groups.

11. The method of claim 7, wherein clustering resource accessors comprises at least one of the following:
    using a k-means clustering algorithm; or
    using a k-nearest-neighbors clustering algorithm.

12. The method of claim 7, wherein the method clusters resource accessors into at least ten times N accessor clusters.

13. The method of claim 7, wherein the method clusters at least one thousand resource accessors into at least twenty accessor clusters, and distributes analysis workloads to at least ten analysis nodes.

14. The method of claim 7, wherein the method avoids randomly assigning resource accessors to analysis nodes.

15. The method of claim 7, wherein the method assigns at least fifty percent of resource accessors to the same analysis node as at least sixty percent of their security peers.

16. A computer-readable storage medium configured with data and instructions which upon execution by a processor cause a computing system to perform a method for software performance optimization, the method comprising:
    clustering resource accessors into at least N accessor clusters, where N is at least three;

assigning each accessor cluster to an analysis node in a set of N analysis nodes;

identifying a resource accessor Ak that is associated with an analysis workload AWi;

finding the same resource accessor Ak in an accessor cluster ACm that is assigned to an analysis node ANj; and distributing analysis workload AWi to the analysis node ANj, thereby optimizing performance of analysis workloads which involve peers of accessor Ak.

17. The storage medium of claim 16, wherein the method avoids assigning resource accessors to analysis nodes by assigning tenants to analysis nodes when resource accessors are affiliated with tenants.

18. The storage medium of claim 16, further comprising performing a respective analysis workload on each analysis node, wherein said performing includes:

identifying a resource accessor which is a security peer of a resource accessor that belongs to a cluster assigned to the analysis node; and retrieving data about the security peer from a data cache on the analysis node instead of retrieving the data from a location outside the analysis node.

19. The storage medium of claim 16, wherein distributing analysis workload AWi to the analysis node ANj comprises caching on ANj statistical data about resource access attempts by resource accessor Ak and statistical data about resource access attempts by at least one security peer of Ak.

20. The storage medium of claim 16, comprising performing analysis workload AWi on the analysis node ANj, wherein the performing includes determining that resource accessor Ak attempted to access a resource Rnew that was not previously accessed by Ak, and ascertaining whether one or more security peers of Ak have accessed Rnew.

\* \* \* \* \*